United States Patent
Buckle et al.

(10) Patent No.: US 7,582,125 B2
(45) Date of Patent: Sep. 1, 2009

(54) METHOD OF FORMING A NICKEL LAYER ON THE CATHODE CASING FOR A ZINC-AIR CELL

(75) Inventors: Keith Buckle, Southbury, CT (US); Leo White, Bristol, CT (US); David L. Pappas, Danbury, CT (US)

(73) Assignee: The Gillette Company, Boston, MA (US)

( * ) Notice: Subject to any disclaimer, the term of this patent is extended or adjusted under 35 U.S.C. 154(b) by 706 days.

(21) Appl. No.: 10/998,201

(22) Filed: Nov. 26, 2004

(65) Prior Publication Data
US 2006/0115724 A1    Jun. 1, 2006

(51) Int. Cl.
*H01M 6/00* (2006.01)
*C22F 1/10* (2006.01)

(52) U.S. Cl. .................. 29/623.1; 29/623.5; 148/675

(58) Field of Classification Search ............ 29/623.1, 29/623.5; 429/164, 176; 148/675, 559
See application file for complete search history.

(56) References Cited

U.S. PATENT DOCUMENTS

| | | | |
|---|---|---|---|
| 3,897,265 A | 7/1975 | Jaggard | |
| 4,173,685 A * | 11/1979 | Weatherly | .................. 428/556 |
| 4,333,993 A | 6/1982 | Gibbard | |
| 5,279,905 A | 1/1994 | Mansfield | |
| 5,306,580 A | 4/1994 | Mansfield | |
| 6,447,947 B1 | 9/2002 | Huq | |
| 6,555,266 B1 * | 4/2003 | Woodnorth et al. | ......... 429/164 |

FOREIGN PATENT DOCUMENTS

JP    01-301866    * 12/1989

* cited by examiner

*Primary Examiner*—Raymond Alejandro
(74) *Attorney, Agent, or Firm*—Barry D. Josephs

(57) ABSTRACT

A method of forming a nickel layer on a metal substrate forming the terminal contact area of the cathode casing for a zinc-air cell. A cathode casing in desired shape and size for a zinc-air cell is formed of a substrate metal such as cold rolled steel or stainless steel. A nickel layer is plated onto the cathode casing substrate metal over the terminal contact area and is subsequently heat treated resulting in reduction in the surface hardness. The method of heat treatment involves heating the substrate metal with nickel plated thereon in an inert atmosphere at temperatures preferably between about 860° F. and 135° F. The method reduces the nickel surface hardness to a level below 8 GPa. This improves the electrical contact with the hearing aid or other device being powered.

6 Claims, 3 Drawing Sheets

METHOD OF FORMING A NICKEL LAYER ON THE CATHODE CASING FOR A ZINC-AIR CELL

FIELD OF THE INVENTION

The invention relates to a zinc/air cell having an anode comprising zinc and an air cathode and a cathode can having an outer nickel layer. The invention relates to a method of treating the nickel layer on the cathode can to soften the nickel resulting in a cell having more reliable electrical contact with the device, such as a hearing aid, being powered.

BACKGROUND

Zinc/air cells are typically in the form of a miniature button cells which have particular utility as batteries for electronic devices and hearing aids including programmable type hearing aids. Such miniature cells typically have a disk-like cylindrical shape of diameter between about 4 and 16 mm, preferably between about 4 and 12 mm and a height between about 2 and 9 mm, preferably between about 2 and 6 mm. Zinc air cells can also be produced in somewhat larger sizes having a cylindrical casing of size comparable to conventional AAAA, AAA, AA, C and D size $Zn/MnO_2$ alkaline cells and even larger sizes. Zinc air cells can also be in other shapes, for example, elliptical or shapes having at least one flat side such as, prismatic, or rectangular shape.

The miniature zinc/air button cell typically comprises an anode casing (anode cup), and a cathode casing (cathode cup). The anode casing and cathode casing each typically have a cup shaped body with integral closed end and opposing open end. After the necessary materials are inserted into the anode and cathode casings, the open end of the cathode casing is typically inserted over the open end of the anode casing with insulating material therebetween and the cell sealed by crimping. The anode casing can be filled with a mixture comprising particulate zinc. Typically, the zinc mixture contains mercury and a gelling agent, and the zinc mixture becomes gelled when electrolyte is added to the mixture. The electrolyte is usually an aqueous solution of potassium hydroxide, however, other aqueous alkaline electrolytes can be used. The cathode casing contains an air diffuser (air filter) which lines the inside surface of the cathode casing's closed end. The air diffuser can be selected from a variety of air permeable materials including paper and porous polymeric material. The air diffuser is placed adjacent air holes in the surface of the closed end of the cathode casing. Catalytic material typically comprising a mixture of particulate manganese dioxide, carbon and hydrophobic binder can be inserted into the cathode casing over the air diffuser on the exposed side of the air diffuser not contacting the air holes. An ion permeable separator is typically applied over the catalytic material so that it faces the open end of the cathode casing.

The cathode casing can typically be of nickel plated cold rolled steel or nickel plated stainless steel, for example, with the nickel plate forming the cathode casing's outside surface and cold rolled steed or stainless steel forming the casing's internal layer. The anode casing can be of a triclad material composed of stainless steel having an outer layer of nickel and an inner layer of copper. In such embodiment the nickel layer typically forms the anode casing's outside surface and the copper layer forms the anode casing's inside surface. The copper inside layer is desirable in that it provides a highly conductive pathway between the zinc particles and the cell's negative terminal at the closed end of the anode casing. An insulator ring of a durable, polymeric material can be inserted over the outside surface of the anode casing. The insulator ring is typically of high density polyethylene, polypropylene or nylon which resists flow (cold flow) when squeezed.

After the anode casing is filled with the zinc mixture and after the air diffuser, catalyst, and ion permeable separator is placed into the cathode casing, the open end of the cathode casing can be inserted over the open end of the anode casing with the insulator ring therebetween. The peripheral edge of the cathode casing can then be crimped over the peripheral edge of the anode casing to form a tightly sealed cell. The insulator ring around the anode casing prevents electrical contact between the anode and cathode cups. A removable tab is placed over the air holes on the surface of the cathode casing. Before use, the tab is removed to expose the air holes allowing air to ingress and activate the cell. A portion of the closed end of the anode casing can function as the cell's negative terminal and a portion of the closed end of the cathode casing can function as the cell's positive terminal.

Typically, mercury is added in amount of at least one percent by weight, for example, about 3 percent by weight of the zinc in the anode mix. The mercury is added to the anode mix to improve interparticle contact between zinc particles in the anode mixture. This in turn improves electrical conductivity within the anode and thus results in increased cell performance, for example, higher actual specific capacity of the zinc (Amp-hour/g). Also addition of mercury tends to reduce the hydrogen gassing which can occur in the zinc/air cell during discharge and when the cell is placed in storage before or after discharge. The gassing, if excessive, increases the chance of electrolyte leakage, which will reduce cell performance and can damage or destroy the hearing aid or other electronic component being powered.

U.S. Pat. No. 3,897,265 discloses a representative zinc/air button cell construction with an anode casing inserted into the cathode casing. There is disclosed an insulator between the anode and cathode casings. The anode comprises zinc amalgamated with mercury. The cell includes an assembly comprising an air diffuser, cathode catalyst, and separator at the closed end of the cathode casing facing air holes in the surface of the cathode casing.

U.S. Pat. No. 5,279,905 discloses a miniature zinc/air cell wherein little or no mercury has been added to the anode mix. Instead, the inner layer of the anode casing has been coated with a layer of indium. The disclosed anode casing can be a triclad material composed of stainless steel plated on the outside surface with nickel and on the inside surface with copper. The copper layer is at least 1 microinch ($25.4 \times 10^{-6}$ mm). The reference discloses coating the copper layer on the anode casing's inside surface with a layer of indium. The indium layer is disclosed as being between about 1 microinch and 5 microinches ($25.4 \times 10^{-6}$ mm and $127 \times 10^{-6}$ mm).

U.S. Pat. No. 6,447,947 B1 discloses a miniature zinc/air cell wherein little or no mercury has been added to the anode mix. The disclosed anode casing can be a triclad material composed of stainless steel plated on the outside surface with nickel and on the inside surface with copper. The anode can is heat treated with an inert gas at elevated temperatures before anode material comprising a zinc slurry is inserted into the casing. The heat treating process of the anode can treats the copper surface texture and removes oxides therefrom. This significantly reduces gassing during cell discharge and storage and eliminates the need to add mercury to the anode material.

It has been determined that an occasional problem can occur during and after insertion of the zinc-air battery into certain hearing aid battery compartments which can result in diminished electrical contact between the battery and hearing aid. This in turn can lead to scratching background noises or intermittent loss in hearing aid output tone and amplification. This problem can occur regardless of whether there is mercury added to the anode, for example, 3 percent by weight or less mercury based on zinc or even if the anode contains zero added mercury.

The problem has been traced to inadequate electrical contact which may occasionally occur between the cathode casing (cathode cup) and certain electrical contacts within the hearing battery compartment, particularly when the contact terminal within the battery compartment is of stainless steel.

It is thus desired to improve the electrical contact between the zinc-air cell cathode cup and its contact within the hearing aid or other device being powered. It is desired to produce such contact so that the hearing aid or other audio device being powered will produce clear output signals without distracting scratching background noises or intermittent loss in output.

SUMMARY OF THE INVENTION

An aspect of the invention is directed to zinc-air cells, particularly zinc-air cells formed of an anode casing (anode cup) and interlocking cathode casing (cathode cup) with insulation therebetween. In a principal application such cells may be in the form of small button cells useful in powering audio devices such as a hearing aid. The invention is directed to cathode cups which are formed of a metal substrate, typically cold rolled steel or stainless steel, which in turn is overplated with a layer of nickel. The nickel layer is typically plated on all surfaces of the cathode cup, but the invention applies to cathode cups wherein at least the terminal contact portion of the metal substrate forming the cathode cup is plated with a layer of nickel.

An aspect of the invention is directed to treating the nickel layer on the surface of the cathode cup, preferably after it has been plated onto the cathode cup metal substrate in order to soften at least the terminal contact portion of the nickel layer. The terminal contact portion of the cathode cup normally comprises the central portion of the closed end of the cup that is intended to contact the corresponding terminal within the hearing aid or other device being powered. Such contact portion of the cathode cup may be raised in relation to the remaining (surrounding) surface of the closed end or may be unraised in relation to the remaining surface of the closed end. It is desired to soften such contact portion from the nickel surface to a depth of at least within the first 500 nanometers depth of the nickel. Preferably it is desired to soften such contact portion from the surface of the nickel layer to a level measured at the 200 nanometer depth of the nickel, preferably as measured at the 50 nanometers depth of the nickel. A conventional nanoindenter may be used to measure the nickel surface hardness at a particular depth (nanometers) from the nickel surface.

The cathode cup of the zinc-air cell may have a thickness typically between about 1 and 12 mil (0.0254 and 0.305 mm), preferably between about 2.5 and 12 mil (0.0635 and 0.305 mm). The cathode cup is formed of a metal substrate, which is typically cold rolled steel or stainless steel. The metal substrate desirably has a surface roughness, Ra (average roughness in micrometers) between about 0.06 and 0.25 micrometers, preferably between about 0.12 and 0.25 micrometers. (The average roughness, Ra, in micrometers is an average of the distance between the high and low points on the surface of the metal substrate.) The nickel layer may be plated on said metal substrate to a thickness desirably between about 30 and 500 microinches (0.762 and 12.7 micron), preferably between about 90 and 500 microinches (2.286 and 12.7 micron). Desirably the nickel layer plated on said metal substrate has a thickness of between about 30 and 380 microinches (0.762 and 9.65 micron). Preferably the nickel layer is plated to a thickness between about 90 and 380 microinches (2.286 and 9.65 micron), typically between about 90 and 140 microinches (2.286 and 3.56 micron) on the metal substrate. Such nickel layer is preferably plated by electroless (chemical) method but may also be plated by electrolytic methods.

Preferably the nickel layer is plated onto the metal substrate, e.g. cold rolled steel or stainless steel, which has already been formed into the desired shape and size of the cathode cup. However, the nickel layer can be plated onto the metal substrate, e.g. cold rolled steel or stainless steel, before it is drawn into the shape of the cathode cup. The cathode cup is then heated at a level sufficient to reduce the nickel surface hardness. Desirably the cathode cup is heated between about 860° F. and 1350° F. for a period between about 2 and 12 minutes in a substantially inert atmosphere. The cathode cup is heated desirably for a period of 3 to 8 minutes, preferably 4 to 6 minutes. The atmosphere comprises mostly an inert gas such as nitrogen and preferably may also contain a minor amount of hydrogen. For example, the heating atmosphere may comprise 100 vol % nitrogen, or between about 60 and 90 vol % nitrogen and the remainder between about 40 and 10 vol % hydrogen. In a preferred embodiment the cathode cup with said nickel layer plated thereon is heated at a temperature of about 1216° C. for about 4 minutes in an atmosphere of 90% nitrogen and 10% hydrogen. The cathode cup after said heat treatment results in a softened nickel layer when measured at ambient temperature. The nickel layer within the terminal contact area on the surface of the cathode cup is softened to a surface hardness of less than 8 GPa (Giga pascal), preferably between 2 and 7 GPa, more preferably between 2 and 5 GPa as measured at ambient temperature using a surface indentation tester penetrating into the nickel layer down to at a depth level of 500 nanometers from the nickel surface. Typically the remaining nickel below the depth of 500 nanometers has an average hardness of greater than 8 GPa. Desirably the nickel layer on said metal substrate, e.g. cold rolled steel or stainless steel, forming the cathode cup, has a surface hardness of less than 8 GPa (Giga pascal), preferably between 2 and 7 GPa, more preferably between 2 and 5 GPa as measured at ambient temperature using a surface indentation tester penetrating into the nickel layer down to a depth level of 100 nanometers from the nickel surface. The remaining nickel below the depth of 100 nanometers typically has an average hardness of greater than 8 GPa. Preferably the nickel layer on said metal substrate, e.g. cold rolled steel or stainless steel, forming the cathode cup, has a surface hardness of less than 8 GPa (Giga pascal), preferably between 2 and 7 GPa, more preferably between 2 and 5 GPa as measured at ambient temperature using a surface indentation tester penetrating into the nickel layer down to at a depth of 50 nanometers from the nickel surface. The remaining nickel below the depth of 50 nanometers may have an average hardness of greater than 8 GPa.

The resulting cathode cup for the zinc-air cell having said softened nickel layer produces a more intimate, more uniform and more reliable positive contact with the corresponding terminal contact within the device, e.g. hearing aid being powered, particularly when said device contact is stainless steel. Typically the corresponding device terminal is resilient (spring loaded) to assist in establishing good terminal contact with the cathode cup. The softened nickel layer in the region of the contact portion of the cathode cup improves the reliability of the contact with the corresponding device terminal regardless of the degree of resiliency (spring loading) of such device terminal. This results in clear, uninterrupted tone at the expected amplification level if the device being powered is an audio device, e.g. hearing aid, even if the device is jarred intermittently during use.

An aspect of the invention is directed to cathode casings (cathode cups) of zinc-air cells having an outer layer of nickel. In particular the invention is directed to cathode casing of a zinc-air cell formed of cold rolled steel or stainless steel which in turn is plated with nickel. The nickel may be plated on the cold rolled steel or stainless steel substrate by conventional methods, including chemical methods (electroless) and electrolytic plating methods. The nickel is usually plated on the cold rolled steel or stainless steel substrate so that it completely covers all surfaces of the substrate. The surface portion of the cathode cup in contact with the corresponding terminal in the device or hearing aid being powered is thus nickel. In particular the invention is directed to embodiments wherein the electrical contact portion (positive terminal) on the surface of the cathode cup is nickel and the corresponding contact within the device such as a hearing aid being powered is stainless steel.

Although a preferred application of the present invention is directed to treating the cathode cup of a zinc-air cell to soften an exposed nickel layer thereon, it will be appreciated that the concept of the invention can be applied as well to any electrical cell housing. In particular the concept of the invention can be applied to heat treating an exposed nickel layer on at least the portion of the cell housing forming a contact terminal in order to soften the nickel surface and make the contact area more reliable. Although nickel is preferred, other metals instead of nickel could be plated onto a metal substrate forming the cell housing. The substrate with plated metal thereon could be subsequently heat treated before or after the housing is shaped and formed in order to soften the exposed plated metal thereon.

BRIEF DESCRIPTION OF THE DRAWINGS

The invention will be better understood with reference to the drawings in which.

DETAILED DESCRIPTION

Figure 1:
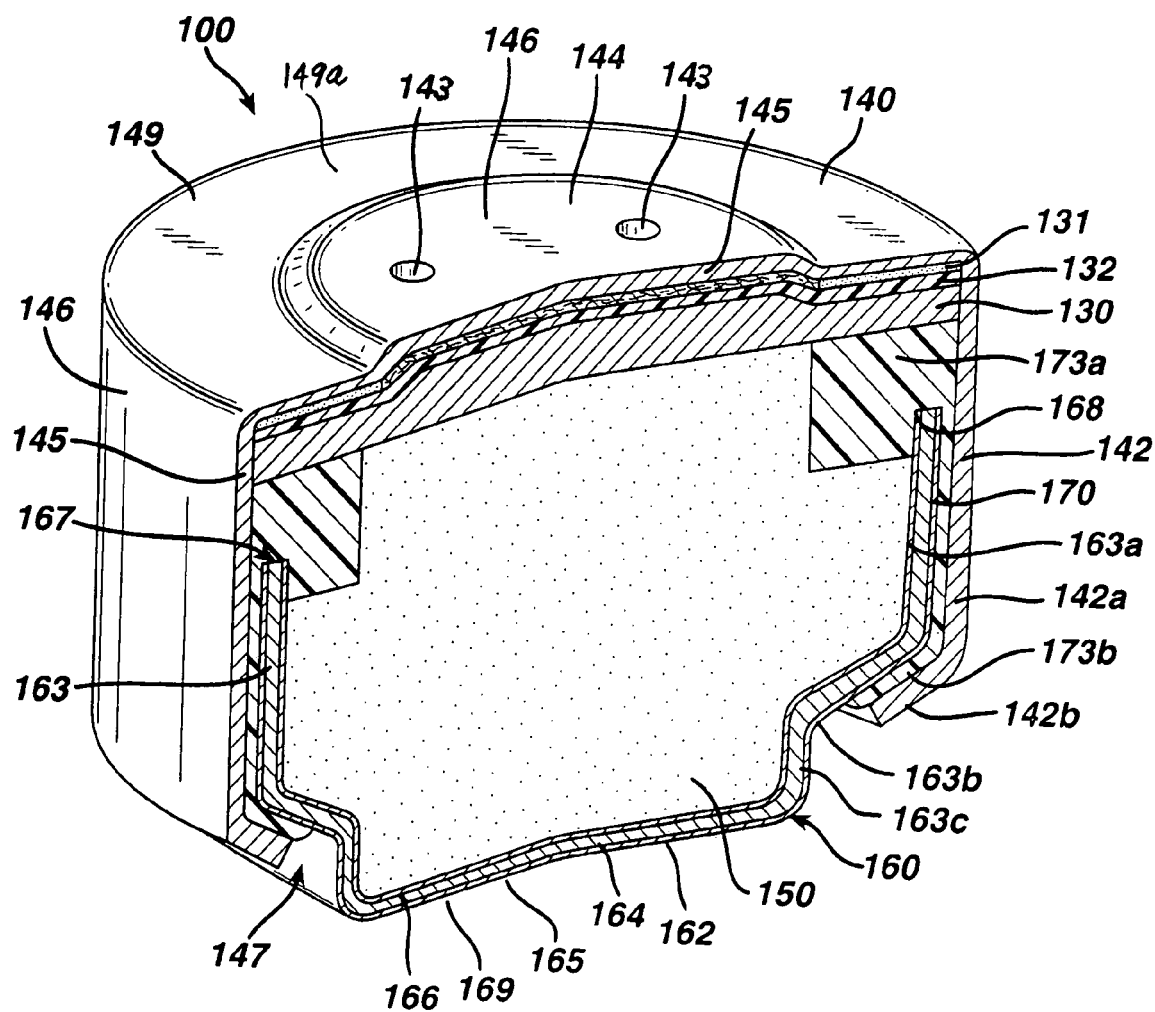
FIG. 1 is an isometric cross sectional view of an embodiment of the zinc/air cell of the invention.

The invention is directed to gas depolarized electrochemical cells. Such cells have a metal anode, typically comprising zinc and an air cathode. The cell is commonly referred to as a metal/air depolarized cell, and more typically a zinc/air cell.

The zinc/air cell of the invention typically has a small amount of mercury added to the anode, e.g. about 3 percent by weight of the zinc, but the invention is intended to apply to zinc/air cells with lesser amounts of added mercury or irrespective of whether any mercury is added. The zinc/air cell is desirably in the form of a miniature button cell having an anode comprising zinc and an air cathode. The cell has particular application as a power source for audio devices such as electronic hearing aids. The miniature zinc/air cell of the invention typically has a disk-like cylindrical shape of diameter between about 4 and 16 mm, preferably between about 4 and 12 mm and a height between about 2 and 9 mm, preferably between about 2 and 6 mm. The miniature zinc/air cell typically has an operating load voltage between about 1.3 volt to 0.2 volt. The cell typically has a substantially flat discharge voltage profile between about 1.1 and about 0.9 volt whereupon the voltage can then fall fairly abruptly to a cut-off of about 0.85 volt. The cell can be discharged at a rate between about 1 and 15 milliAmp, or typically with a resistance load of between about 50 and 3500 Ohm. The term "miniature cells" or "miniature button cells" as used herein is intended to include such small size button cells, but is not intended to be restricted thereto, since other shapes and sizes for small zinc/air cells are possible. For example, zinc air cells could also be produced in somewhat larger sizes having a cylindrical casing of size comparable to conventional AAAA, AAA, AA, C and D size $Zn/MnO_2$ alkaline cells, and even larger. The zinc/air cell may also have other shapes, for example, elliptical shape or wherein one or more surfaces are substantially flat such as a prismatic or rectangular cell.

The cell of the invention can have a very small amount of lead additive in the anode. If lead is added to the anode, the lead content in the cell can typically be between about 100 and 1000 ppm of the zinc in the anode. However, the cell of the invention desirably can also be essentially lead free, that is, the total lead content can be less than 30 ppm, desirably less than 15 ppm of the zinc content of the anode. The cell of the invention can also have other metal additives in the anode, for example, indium, which is desirably added or plated onto the surface the zinc particles in amount between about 100 and 1000 parts per million by weight (ppm), preferably between about 200 and 1000 ppm of the zinc. Such additives are intended to improve conductivity of the zinc particles and reduce gassing. They thus serve to reduce or eliminate the need to add mercury. Thus the invention is intended to apply to cells which contain added amounts of mercury in the anode, for example 3 percent by weight or less of mercury based on zinc. Also the invention is intended to apply to cells which are essentially mercury free (zero added mercury cell). Accordingly, the zinc/air cell 100 of the invention may have a total mercury content less than about 100 parts per million parts by weight of zinc in the anode, preferably less than 50 parts per million parts by weight of zinc in the anode. (The term "essentially mercury free" as used herein shall mean the cell has a mercury content less than about 100 parts per million parts by weight of zinc in the anode.)

The zinc/air cell 100 of the invention has an anode casing 160 (anode cup), a cathode casing 140 (cathode cup), and electrical insulator material 170 therebetween. The anode casing 160 has a circumventing body 163, an integral closed end 169, and an opposing open end 167. The cathode casing 140 has a circumventing body 142, an integral closed end 149 and an opposing open end 147. The anode casing 160 contains an anode mixture 150 comprising particulate zinc and alkaline electrolyte. The cathode casing 140 has a plurality of air holes 143 in its surface at the closed end thereof. A catalytic composite material 134 is placed within casing 140 and proximate to the air holes. During cell discharge, the catalytic material 134 facilitates the electrochemical reaction with ambient oxygen as it ingresses through air holes 143 and reacts with electrolyte. The top central portion of the cathode casing 140 forms the terminal contact area of the cathode casing. That is, at least a portion of the surface of area 144 will contact a corresponding device terminal when the cell is inserted into the battery compartment of a device being powered, such as a hearing aid. Terminal contact area 144 may be raised as shown in FIG. 1 or may be unraised, that is, at the same level or in the same plane as the surrounding surface 149a.

The cathode casing 140 of the zinc-air cell 100 may have a thickness typically between about 1 and 12 mil (0.0254 and 0.305 mm), preferably between about 2.5 and 12 mil (0.0635 and 0.305 mm). The zinc/air cell 100 typically has a disk-like cylindrical shape of diameter between about 4 and 16 mm, preferably between about 4 and 12 mm and a height between about 2 and 9 mm, preferably between about 2 and 6 mm. It will be appreciated that the zinc/air cell may also have other shapes and sizes, for example, elongated cylindrical, elliptical shape, prismatic or flat shape, or wherein at least one of the casing surfaces are substantially flat. The principal aspect of the present invention directed softening the nickel layer 146 on the cathode can metal substrate 145 is thus also intended to be applicable to such other cell shapes.

Figure 4:
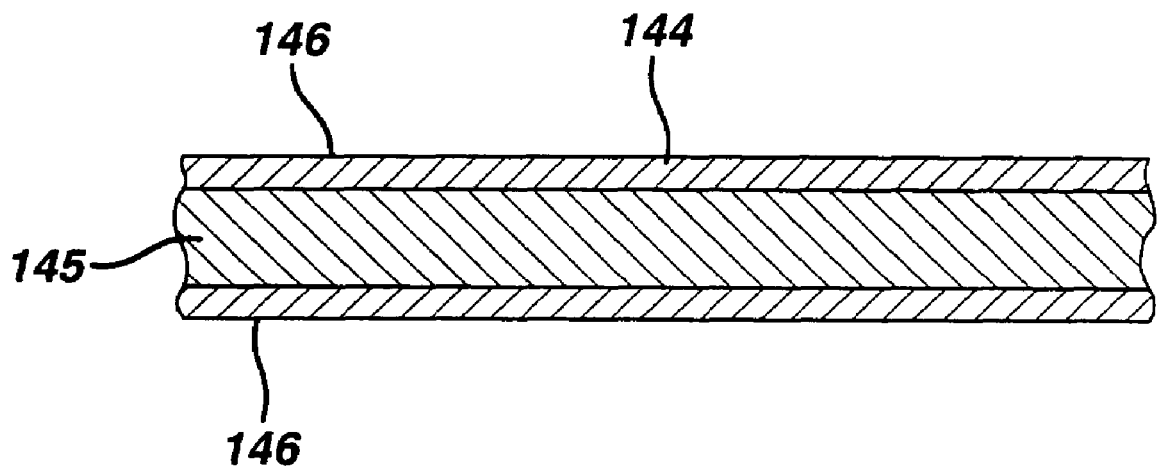
FIG. 4 is a cross sectional view of an embodiment of the cathode casing wall.

The cathode casing 140 of the zinc/air cell 100 is formed of a metal substrate 145, which is typically cold rolled steel or stainless steel. The metal substrate desirably has a surface roughness, Ra (average roughness in micrometers between high and low points on the surface) between about 0.06 and 0.25 Ra (micrometers), preferably between about 0.12 and 0.25 Ra (micrometers). A nickel layer 146 is preferably plated on both inside and outside surfaces of the metal substrate 145 as shown in FIG. 4. The nickel layer 146 may be plated on said metal substrate 145 to a thickness between about 30 and 500 microinches (0.762 and 12.7 micron), preferably between about 90 and 500 microinches (2.286 and 12.7 micron). The nickel layer 146 has a thickness desirably between about 30 and 380 microinches (0.762 and 9.65 micron), preferably between about 90 and 380 microinches (2.286 and 9.65 micron), typically between about 90 and 140 microinches (2.286 and 3.56 micron).

Cathode casing 140 is formed of a metal substrate 145, typically cold rolled steel or stainless steel, desirably having the above surface roughness between about 0.06 and 0.25 Ra (micrometers), preferably between about 0.12 and 0.25 Ra (micrometers). Preferably the metal substrate 145 is first drawn into the desired cup shape, for example, as shown in FIG. 1. At least the terminal contact area 144 of the cathode casing 140 is then plated with a layer of nickel 146, but normally all surfaces of the metal substrate 145 are plated with nickel as shown in FIG. 4. Alternatively, the nickel layer 146 can be plated onto the metal substrate 145, e.g. cold rolled steel or stainless steel, before metal substrate 145 is drawn into the shape of the cathode cup. The plating may be accomplished using conventional methods which preferably include chemical methods (electroless plating) or electrolytic methods. The electroless method of plating nickel is desirable because of its uniformity of coating, and also because of resistance of the plated nickel to abrasion. Electroless methods of plating nickel permit greater control over the plating thickness and permit plating of thinner layers of nickel without pinholes, for example, between about 90 and 500 microinches (2.286 and 12.7 micron), preferably between about 90 and 380 microinches (2.286 and 9.65 micron). This also results in improved appearance of the plated nickel. The electroless method for plating nickel on metal substrates such as cold rolled steel or stainless steel are well known and discussed, for example, in Wolfgang Riedel, "Electroless Nickel Plating", Finishing Publications Ltd. (1991). The plated nickel resulting from such electroless plating has a relatively high surface hardness of greater than 8 GPa (Giga pascal) as measured at typical depths, for example, at 50 Angstrom depth, 100 Angstrom depth, or 500 Angstrom depth from the nickel surface. A conventional nanoindenter, for example, such as nanoindenter Model SA2 from MTS Systems Corp., Eden Prairie, Minn. can be used to measure the surface hardness of the plated nickel 146.

The nickel layer 146 has a thickness desirably between about 30 and 500 microinches (0.762 and 12.7 micron), preferably between about 90 and 500 microinches (2.286 and 12.7 micron). Desirably the nickel layer 146 is between about 90 and 380 microinches (2.286 and 9.65 micron), typically between about 90 and 140 microinches (2.286 and 3.56 micron). A batch of these casings 140 are preferably electroplated with nickel by conventional barrel plating electrolytic methods wherein a layer of nickel 146 becomes plated preferably on all surfaces of the cathode casing 140. Electrolytic plating of nickel on metal substrates such as cold rolled steel or stainless steel may be preferred over chemical (electroless) plating methods because the electrolytic method tends to give improved overall appearance of the cathode casing 140. This is because of the somewhat higher plating thicknesses which can be obtained with electrolytic plating. Cost can also be reduced with electrolytic plating because more casings can usually be plated in a given batch.

The term "nickel" or "nickel layer" as used herein shall be understood to mean at least one layer and is thus intended to also extend to and include the possibility of a plurality of nickel layers separately applied one onto the other, on the metal substrate 145 forming the cathode casing 140. Also the nickel could be alloyed with trace or minor amounts of other metals so the term "nickel" is intended to extend to and include such possibility. Typically the nickel layer 146 is at least 99.9 wt. % pure nickel, but the purity level may also be less wherein the physical properties of such alloy is substantially that of pure nickel.

The nickel layer 146 which is plated onto the metal substrate 145 such as cold rolled steel or stainless steel has been determined to have a relatively high surface hardness of greater than 8 GPa (Giga pascal), particularly if the nickel is plated by electrolytic methods. In particular it has been determined that the surface hardness of the nickel layer electolytically plated on the metal substrate as measured down to a level of 50 nanometer, or 100 nanometers, or even 500 nanometers is greater than 8 GPa even if the electrolysis is carried out under varied plating conditions such as adjusted current densities. It has been determined that such relative high surface hardness of greater than about 8 GPa can lead to scratching background noises when the miniature zinc-air cells are inserted into the battery compartments of certain types of hearing aids, such as behind the ear type hearing aids, particularly those with stainless steel terminal contacts. Insertion of the zinc-air cell with conventional nickel plated cathode casing (nickel surface hardness greater than 8 GPa) into the battery compartment of such hearing aids, for example, insertion of the zinc-air cell with conventional nickel plated cathode casing into a Phonak behind the ear hearing aid model Sono Forte 331X having stainless steel contacts immediately activates the hearing air producing scratching background noises. These noises can be distractive even though they tend to diminish or fade away when the battery compartment door is closed. It has also been determined that the relative high surface hardness (greater than 8 GPa) of conventional nickel plating on the metal substrate forming the cathode casing can result in intermittent loss of battery power in such hearing aid, if the hearing aid is abruptly jarred. This may occur, for example, if the user is engaged in sports or is otherwise physically very active. A solution to the problem as herein describe is to heat treat the nickel layer 146 after is has been plated onto the metal surface 145 of the cathode casing 140.

In accordance with a preferred embodiment after nickel layer 146 is plated onto metal substrate 145 the cathode casing 140 is then heated. In accordance with a preferred embodiment of the invention the cathode casing 140 is heat treated to reduce the surface hardness of the nickel layer 146 as measured at ambient temperature. Desirably cathode casing 140 with nickel layer 146 thereon is heated to temperature between about 860° F. and 1350° F. for a period typically between about 2 and 12 minutes or even longer in a substantially inert atmosphere. The atmosphere may be comprised entirely of an inert gas such as nitrogen. Preferably the heating atmosphere also contains a minor amount of hydrogen. For example, the heating atmosphere may comprised of between about 60 and 90 vol % nitrogen and the remainder between 40 and 10 vol %, respectively, hydrogen. The presence of hydrogen reduces the chance of surface oxides forming during the heat treatment process. In a preferred embodiment the cathode casing 140 with said nickel layer plated thereon is heated at a temperature of about 1275° F. for about 6 minutes in an atmosphere of 90 vol % nitrogen and 10 vol % hydrogen. After cooling to ambient temperatures, it has been determined that the nickel layer 146 on said cathode casing 140 has become softened to a surface hardness of less than 8 GPa (Giga pascal) as a result of such heat treatment.

A conventional surface indenter may be used to measure surface hardness of the nickel layer 146 a specified depth of the plated nickel from its surface. The indenter employed for making such measurements was a Nano Indenter Model SA2 from MTS Systems Corporation, Eden Prairie, Minn. Specifically, the exposed nickel layer 145 within the terminal contact area 144 on the surface of the cathode casing is softened to a surface hardness of less than 8 GPa (Giga pascal), for example, between 2 and 8 GPa (Giga pascal), preferably between 2 and 7 GPa, more preferably between 2 and 5 GPa as measured at ambient temperature using the above surface indentation tester penetrating into the nickel layer 146 down to at a depth level of 500 nanometers from the nickel surface. Preferably the remaining nickel below the depth of 500 nanometers has an average hardness of approximately 3 GPa. In a preferred embodiment the nickel layer 146 on said metal substrate 145, e.g. cold rolled steel or stainless steel, has a surface hardness of less than 8 GPa (Giga pascal), for example, between 2 and 8 GPa (Giga pascal), preferably between 2 and 7 GPa, more preferably between 2 and 5 GPa as measured at ambient temperature using the above surface indentation tester penetrating into the nickel layer down to at a depth level of 100 nanometers from the nickel surface. Preferably the remaining nickel below the depth of 100 nanometers has an average hardness of approximately 3 GPa. In another preferred embodiment the nickel layer 146 on said metal substrate 145, e.g. cold rolled steel or stainless steel, has a surface hardness of less than 8 GPa (Giga pascal), for example, between 2 and 8 GPa (Giga pascal), preferably between 2 and 7 GPa, more preferably between 2 and 5 GPa as measured at ambient temperature using the above surface indentation tester penetrating into the nickel layer down to at a depth level of 50 nanometers from the nickel surface. Preferably the remaining nickel below the depth of 100 nanometers has an average hardness of approximately 3 GPa. The following example is illustrative of the improved results obtained with a zinc-air cell 100 having a cathode casing 140 with an exposed softened nickel layer 146 at the cathode casing terminal contact area 144:

Example 1

A control zinc-air cell 100 was prepared in accordance with the methods described herein using conventional anode and cathode materials and cell components as described herein. The chemical compositions of anode and cathode, cell components, and details of cell assembly are described in the ensuing description of the appearing after this example. The anode comprised 3 Wt. % mercury which was amalgamated with the zinc. However, the same improvement obtained with softening the nickel layer at the terminal contact area 144 is independent of adding mercury to the anode. The anode casing was of triclad material (i.e. stainless steel cladded on the outside surface with nickel and on the inside surface with copper). The cathode casing 140 was formed of a cold rolled metal substrate 145 of about 4 mil (0.102 mm) drawn into the general shape shown in FIG. 1. The metal substrate 145 forming cathode casing 140 was then subjected to conventional electroless plating wherein a layer of nickel was plated on all surfaces of the metal substrate 145. Thus the nickel layer 146 was exposed at the terminal contact area 144 on the cathode casing. The nickel layer had a thickness between about 90 and 140 microinches (2.28 and 3.56 micron). A Nanoindenter model SA2 from MTS Systems Corp., Eden Prairie, Minn. was used to measure the surface hardness of the nickel layer 146 on the cathode casing 140 at ambient temperature. The surface hardness of the nickel layer 146 as measured at 50 nanometers depth from surface was 8.2 GPa, at 100 nanometers depth from surface was 8.8 GPa, at 200 nanometers depth form surface was 9.6 GPa, at 300 nanometers depth from the surface was 9.8 GPa, at 400 nanometers depth from surface was 9.8 GPa, at 500 nanometers from the surface was 9.4 GPa.

A test cell was made which was identical with the control cell except that the nickel layer 146 on the cathode casing was subjected to heat treatment in accordance with the invention. The cathode casing with nickel layer 146 plated on the surfaces of the cold rolled steel substrate 145 was subject to heating for about 4 minutes at about 1216° F. in an atmosphere of 90 Vol % nitrogen and 10 vol % hydrogen. After cooling the casing to ambient temperature, the surface hardness of the nickel layer was measured using the above nano indenter model SA2 from MTS Systems Corp. The surface hardness of the nickel layer as measured at 50 nanometers depth from surface was 3.0 GPa, at 100 nanometers depth from surface was 3.5 GPa, at 200 nanometers depth from surface was 3.4 GPa, at 300 nanometers from the surface was 3.3 GPa, at 400 nanometers depth from surface was 3.2 GPa, at 500 nanometers from the surface was 3.1 GPa.

The control cell and test cell as above described were then tested by inserting each into a Phonak behind the ear hearing aid model Sono Forte 331X having stainless steel contacts. When the control cell was inserted into the battery compartment of the Phonak hearing aid a scratching background noise was clearly audible as the hearing aid was placed close to the ear. When the battery compartment door was closed, the scratching noise dissipated. The power output of the cell was then measured as the hearing aid was tapped (jarred) intermittently. During tapping the hearing aid was prone to intermittent loss of voltage by as much as about 0.8 volt which was enough to significantly interfere with the hearing aid amplification and tone.

The test cell with the softened nickel layer 146 on cathode casing 140 as above described was subjected to the same tests as the control cell. There was no discernible scratching noise even if the hearing aid was already positioned into the ear of a person having normal hearing before insertion of the cell. When the test cell was subjected to the same tapping test as used with respect to the control cell, there was no noticeable loss in power output of the cell. Thus the test cell with softened nickel layer 146 clearly outperformed the control cell without softened nickel layer 146 on the cathode casing.

Thus, the cathode casing 140 for the zinc-air cell 100 having said softened nickel layer 146 on metal substrate 145, typically of cold rolled steel or stainless steel, produces a stronger, more uniform and more reliable positive contact with the corresponding terminal contact within the device being powered. The more reliable contact is more noticeable in certain types of audio devices, for example, behind the ear type hearing aids particularly those having stainless steel terminal contacts. The softened exposed nickel layer 146 in the region of the contact area 144 of the cathode casing improves the reliability of the contact with the corresponding device terminal, regardless of the degree of resiliency (spring loading) of the device terminal. This results in clear, uninterrupted tone at the expected amplification level if the device being powered is an audio device, e.g. hearing aid, even if the device is jarred intermittently during use.

In sum the method herein described in heat treating the nickel plated cathode casing 140 results in softening the nickel layer thereon to a surface hardness of less than 8 GPa, desirably between 2 and 7 GPa, preferably between about 2 and 7 GPa, as measured to a depth level of about 500 nanometers, preferably to a level of 100 nanometers, more preferably to a level of 50 nanometers. Such softening of the nickel layer 146 has surprisingly improved contact reliability between the cathode casing terminal contact area 144 and the corresponding terminal of a hearing aid being powered. The improved contact has greatly reduced the chance of scratching noises occurring when the cell is installed into the battery compartment of an audio device such as a behind the ear hearing aid having stainless steel contacts. The improved contact resulting from softening the nickel layer 146 on cathode casing 140 has also reduced the chance of intermittent power loss possibly occurring when the audio device or hearing aid is jarred, for example, when the user is physically very active.

A preferred embodiment of a zinc/air cell of the invention is shown in FIG. 1 and is applicable to the cells referenced in the above Example 1. The embodiment shown in FIG. 1 is in the form of a miniature button cell. The cell 100 comprises a cathode casing 140 (cathode cup), an anode casing 160 (anode cup) with an electrical insulator material 170 therebetween. The cathode casing 140 is formed of a metal substrate 145 of cold rolled steel or stainless steel, which may be shaped into the general shape shown in FIG. 1. A nickel layer 146 is then plated onto the metal substrate 145. The cathode casing 140 with nickel layer 146 thereon is then subjected to heat treatment as above described to soften the nickel layer. The insulator 170 can desirably be in the form of a ring which can be inserted over the outside surface of the anode casing body 163 as shown in FIG. 1. Insulator ring 170 desirably has an enlarged portion 173a extending beyond peripheral edge 168 of the anode casing (FIG. 1). The insulator 170 with enlarged portion 173a prevents anode active material from contacting the cathode casing 140 after the cell is sealed. Insulator 170 is of a durable electrically insulating material such as high density polyethylene, polypropylene or nylon which resists flow (resists cold flow) when squeezed.

The anode casing 160 and cathode casing 140 are initially separate pieces. The anode casing 160 and cathode casing 140 are separately filled with active materials, whereupon the open end 167 of the anode casing 160 can be inserted into the open end 147 of cathode casing 140. The anode casing 160 is characterized by having a first straight body portion 163a of maximum diameter which extends vertically downwardly (FIG. 1) from peripheral edge 168 to a point which is more than at least 50% of the anode casing 160 height whereupon the casing is slanted inwardly to form slanted midportion 163b. There is a second straight portion 163c extending vertically downwardly from the terminal end of midportion 163b. The second straight portion 163c is of smaller diameter than straight portion 163a. The portion 163c terminates with a 90° bend forming the closed end 169 having a relatively flat negative terminal surface 165. The body 142 of cathode casing 140 has a straight portion 142a of maximum diameter extending vertically downwardly from closed end 149. The body 142 terminates in peripheral edge 142b. The peripheral edge 142b of cathode casing 140 and underlying peripheral edge 173b of insulator ring 170 are initially vertically straight and can be mechanically crimped over the slanted midportion 163b of the anode casing 160. This locks the cathode casing 140 in place over the anode casing 160 and forms a tightly sealed cell.

Anode casing 160 can be separately filled with an anode mixture which includes particulate zinc, gelling agent and aqueous potassium hydroxide. The zinc particles may optionally be treated with molten metal binder as described in U.S. Pat. No. 6,300,011 before the anode mixture is formed. The alloy may be indium and bismuth (In/Bi), an alloy of indium, bismuth and tin, (In/Bi/Sn) or alloy of indium and tin (In/Sn) may first be. The metal binder in contact with the zinc particles is then heated to above its melting point. Upon cooling the metal binder solidifies and adheres to the zinc particle surface to form agglomerates wherein the zinc particles are held bound to each other by the metal binder as described in U.S. Pat. No. 6,300,011. Upon cooling a powdered gellant material is added. The particle size of the original zinc used to prepare the mixture (i.e., before the metal binder is added) is desirably between about 30 and 350 micron as determined by passing the particles through a sieve. The zinc used to form the mixture with the molten metal binder of the invention (original zinc) can be pure particulate zinc or can also be in the form of particulate zinc alloyed with indium (100 to 1000 ppm). Said zinc can also be in the form a particulate zinc alloyed with indium (100 to 1000 ppm) and bismuth (100 to 1000 ppm). Other alloys of zinc, for example, particulate zinc alloyed with indium (100 to 1000 ppm) and lead (100 to 1000 ppm) can also be used as the starting (original zinc) materials. These particulate zinc alloys are essentially comprised of pure zinc and have the electrochemical capacity essentially of pure zinc. Thus, the term "zinc" shall be understood to include such materials.

The gellant material can be selected from a variety of known gellants which are substantially insoluble in alkaline electrolyte. Such gellants can, for example, be cross linked carboxymethyl cellulose (CMC); starch graft copolymers (e.g. hydrolyzed polyacrylonitrile grafted unto a starch backbone available under the designation Waterlock A221 from Grain Processing Corp.); cross linked polyacrylic acid polymer available under the designation Carbopol C940 (B.F. Goodrich); alkali saponified polyacrylonitrile available as Waterlock A400 (Grain Processing Corp); and sodium salts of polyacrylic acid, e.g., sodium polyacrylate superabsorbent polymer available under the designation Waterlock J-500 or J-550. A dry mixture of the particulate zinc and gellant powder can be formed with the gellant forming typically between about 0.1 and 1 percent by weight of the dry mixture. A solution of aqueous KOH electrolyte solution comprising between about 30 and 40 wt % KOH and about 2 wt % ZnO is added to the dry mixture and the formed wet anode mixture 50 can be inserted into the anode casing 60. Alternatively, the dry powder mix of particulate zinc and gellant can be first placed into the anode casing 60 and the electrolyte solution added to form the wet anode mixture 50.

Figure 2:
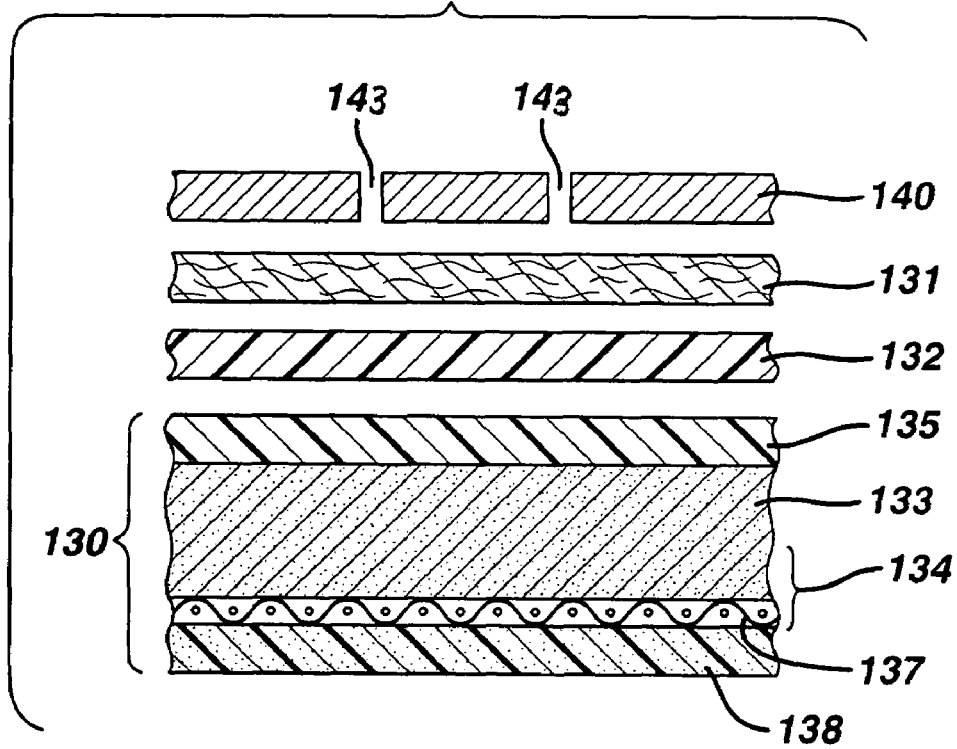
FIG. 2 is an exploded view of the catalytic cathode assembly and air diffuser referenced in FIG. 1.

A catalytic cathode assembly 130 and air diffuser 131 can be inserted into casing 140 as follows: An air diffuser disk 131 (FIGS. 1 and 2), which can be in the form of an air porous filter paper or porous polymeric material can be inserted into the cathode casing 140 so that lies against air holes 143. A separate electrolyte barrier layer 132 (FIGS. 1 and 2), for example, of polytetrafluroethylene (Teflon) can optionally be inserted over the air diffuser 131. The barrier layer 132, if employed, should be hydrophobic and desirably functions to prevent electrolyte from leaking from the cell without significantly retarding the inflow of air into the cell. A catalytic cathode assembly 130 as shown in FIG. 2 can be prepared as a laminate comprising a layer of electrolyte barrier material 135, a layer of cathode catalyst composite 134 under the barrier layer 135 and a layer of ion permeable separator material 138 under the catalyst composite 134, as shown in FIG. 2. Each of these layers can be separately prepared and laminated together by application of heat and pressure to form the catalytic assembly 130. The electrolyte barrier layer 135 can desirably be of polytetrafluroethylene (Teflon). The separator 138 can be selected from conventional ion permeable separator materials including cellophane, polyvinylchloride, acrylonitrile, and microporous polypropylene.

Catalytic cathode composite 134 desirably comprises a hydrophobic catalytic cathode mixture 133 of particulate manganese oxides, carbon, and hydrophobic binder which is applied by conventional coating methods to a surface of an electrically conductive screen 137, preferably a nickel mesh screen. During application the catalytic mixture 133 is substantially absorbed into the porous mesh of screen 137. The manganese dioxide used in the catalytic mixture 133 can be manganese oxide particles which may include manganese dioxide. The carbon used in preparation of mixture 133 can be in various forms including graphite, carbon black and acetylene black. A preferred carbon is carbon black because of its high surface area. A suitable hydrophobic binder can be polytetrafluroethylene (Teflon). The catalytic mixture 133 may typically comprise between about 3 and 10 percent by weight manganese oxides, 10 and 30 percent by weight carbon, and remainder binder. During cell discharge the catalytic mixture 33 acts primarily as a catalyst to facilitate the electrochemical reaction between the incoming air and electrolyte. However additional manganese dioxide can be added to the catalyst and the cell can be converted to an air assisted zinc/air cell. In such cell at least a portion of manganese dioxide becomes discharged, that is, some manganese is reduced during electrochemical discharge along with incoming oxygen.

The individual layers, namely barrier layer 135, catalyst composite 134, and separator 138 can be laminated by application of heat and pressure to form the catalytic assembly 130 shown in FIG. 2. Assembly 130 can be inserted into the cathode casing 140 so that it abuts air diffuser 131 with separator layer 138 facing the open end of casing 140, as shown in FIG. 1. After the air diffuser 131 and catalytic assembly 130 are inserted into casing 140, the open end 167 of the filled anode casing 160 can be inserted into the open end 147 of cathode casing 140. The peripheral edge 142b of the cathode casing can be crimped over the slanted midportion 163b of the anode casing with insulator 170 therebetween, as above described.

Figure 3:
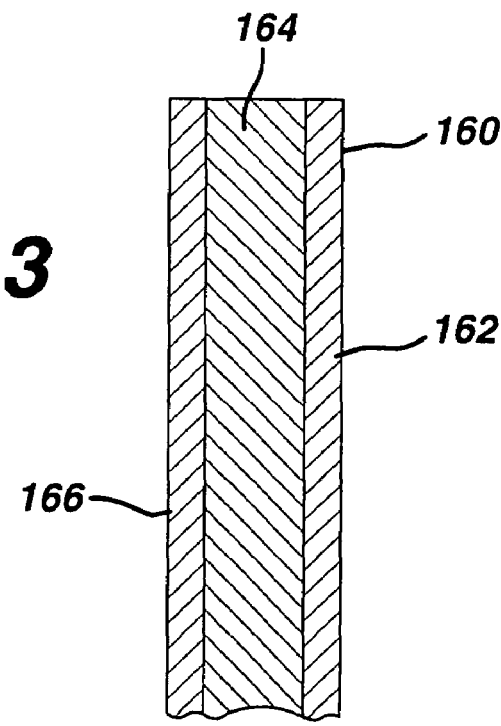
FIG. 3 is a cross sectional view of an embodiment of the anode casing wall.

In the preferred embodiment (FIG. 1) the anode casing 160 has a layer of copper 166 plated or clad on its inside surface so that in the assembled cell the zinc anode mix 150 contacts the copper layer. The copper plate is desired because it provides a highly conductive pathway for electrons passing from the anode 150 to the negative terminal 165 as the zinc is discharged. The anode casing 160 is desirably formed of stainless steel which is plated on the inside surface with a layer of copper. Preferably, anode casing 160 is formed of a triclad material composed of stainless steel 164 which has been clad on its inside surface with a copper layer 166 and on its outside surface with a nickel layer 162 as shown in FIG. 3. Thus, in the assembled cell 100 the copper layer 166 forms the anode casing inside surface in contact with the zinc anode mix 150 and the nickel layer 162 forms the anode casing's outside surface.

The copper layer 166 desirably has a thickness between about 0.0002 inches (0.005 mm) and 0.002 inches (0.05 mm). The stainless steel 164 typically has a thickness between about 0.001 inches (0.0254 mm) and 0.01 inches (0.254 mm) and the nickel layer 162 between about 0.0001 inches (0.00254 mm) and 0.001 inches (0.0254 mm). The total wall thickness of the anode casing 160 composed of the triclad material can be desirably between about 0.001 inches (0.0254 mm) and 0.015 inches (0.38 mm).

In a specific embodiment the cell 100 can have the anode mixture 150 prepared in the manner above described can have the following composition: Zn (78.5 Wt. %); Gelling Agent Waterlock J-550 (0.26 Wt. %); Aqueous KOH electrolyte (19.6 Wt. %); Metal Indium/Bismuth Alloy Binder (1.6 wt. %). The zinc (before addition of the metal binder) can have an average particle size between about 30 and 350 micron as measured by passing the zinc through a sieve. The zinc can be pure or, essentially pure, for example, can be in the form of particulate zinc alloyed with bismuth (100 to 1000 ppm) and indium (100 to 1000 ppm). The aqueous electrolyte can be an aqueous mixture of 35 wt. % KOH and 2 wt. % ZnO. The anode 150 can contain 3 wt. % mercury based on zinc or may contain zero added mercury (mercury content was less than 100 ppm of zinc weight).

The cathode catalyst composite 137 can have the following composition: $MnO_2$ (EMD) 5.0 wt. %, carbon black 15.5 wt %, Teflon binder 18.5 wt. %, and nickel mesh screen, 61.0 wt. %.

Although the invention has been described with reference to specific embodiments, it should be appreciated that other embodiments are possible without departing from the concept of the invention and are thus within the claims and equivalents thereof.

What is claimed is:

1. A method of forming a metal layer consisting essentially of nickel on a metal substrate for a cathode casing of a zinc/air button cell, comprising:
   (a) forming at least a portion of a cathode casing for a zinc/air button cell, wherein said cathode casing comprises a metal substrate comprising cold rolled steel or stainless steel,
   (b) plating a layer consisting essentially of nickel onto said metal substrate so that said nickel covers at least a terminal contact area on the outside of said cathode casing,
   (c) heating the metal substrate with said layer of nickel thereon in a substantially inert atmosphere at a temperature between about 860° F. and 135° F. for between about 2 and 12 minutes to reduce the surface hardness of said nickel layer to a level of between about 2 and 7 giga pascal as measured at a depth of about 100 nanometers from the surface thereof, thereby improving the electrical contact of said cathode casing with a hearing aid device to be powered by the zinc/air cell, (d) electrically connecting said terminal contact area on the outside of said cathode casing to a hearing aid.

2. The method of claim 1 wherein the inert atmosphere comprises a major amount of a chemically inert gas.

3. The method of claim 2 wherein the inert atmosphere comprises nitrogen.

4. The method of claim 1 wherein said terminal contact area comprises a positive electrical contact surface and wherein at least a portion of said heat treated nickel layer forms said positive electrical contact surface.

5. The method of claim 1 wherein said cathode casing is in the shape of a cup and further comprising inserting cathode material into said cathode casing.

6. The method of claim 1 wherein said nickel layer is at least 99.9 percent by weight pure nickel.

* * * * *

UNITED STATES PATENT AND TRADEMARK OFFICE
CERTIFICATE OF CORRECTION

PATENT NO. : 7,582,125 B2  Page 1 of 1
APPLICATION NO. : 10/998201
DATED : September 1, 2009
INVENTOR(S) : Buckle et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1083 days.

Signed and Sealed this

Fourteenth Day of September, 2010

David J. Kappos
*Director of the United States Patent and Trademark Office*